United States Patent
Xin et al.

(10) Patent No.: US 9,772,659 B2
(45) Date of Patent: Sep. 26, 2017

(54) CONNECTING DEVICE AND AN ELECTRONIC APPARATUS

(71) Applicant: Lenovo (Beijing) Co., Ltd., Beijing (CN)

(72) Inventors: Zhifeng Xin, Beijing (CN); Xiaosong Xia, Beijing (CN)

(73) Assignee: LENOVO (BEIJING) CO., LTD., Haidian District, Beijing (CN)

( * ) Notice: Subject to any disclaimer, the term of this patent is extended or adjusted under 35 U.S.C. 154(b) by 65 days.

(21) Appl. No.: 14/870,964

(22) Filed: Sep. 30, 2015

(65) Prior Publication Data

US 2017/0023986 A1    Jan. 26, 2017

(30) Foreign Application Priority Data

Jul. 21, 2015  (CN) .......................... 2015 1 0432334
Jul. 21, 2015  (CN) .......................... 2015 1 0432393

(51) Int. Cl.

| G06F 1/16 | (2006.01) |
| E05D 15/06 | (2006.01) |
| E05D 1/02 | (2006.01) |
| E05D 3/12 | (2006.01) |

(52) U.S. Cl.
CPC ............. *G06F 1/1681* (2013.01); *E05D 1/02* (2013.01); *E05D 15/0621* (2013.01); *G06F 1/1616* (2013.01); *G06F 1/1637* (2013.01); *E05D 3/122* (2013.01); *E05Y 2800/344* (2013.01); *E05Y 2900/606* (2013.01); *G06F 1/1652* (2013.01)

(58) Field of Classification Search
CPC ... G06F 1/1652; G06F 1/1681; H04M 1/0214
See application file for complete search history.

(56) References Cited

U.S. PATENT DOCUMENTS

| 4,486,032 A * | 12/1984 | Leahy ...................... B42F 7/00 |
| | | 24/67 R |
| 5,938,241 A * | 8/1999 | Wilson ..................... B42D 1/08 |
| | | 281/21.1 |
| 6,267,236 B1 * | 7/2001 | Seok ..................... A45C 13/002 |
| | | 206/320 |
| 6,744,623 B2 * | 6/2004 | Numano ............... G06F 1/1632 |
| | | 345/87 |
| 6,791,597 B2 * | 9/2004 | Ando ..................... H04N 7/142 |
| | | 348/14.01 |
| 6,819,961 B2 * | 11/2004 | Jacobs .................. G06F 1/1616 |
| | | 700/17 |
| 7,509,142 B2 * | 3/2009 | Ditzik .................. G06F 1/1615 |
| | | 455/556.1 |

(Continued)

*Primary Examiner* — Adrian S Wilson
(74) *Attorney, Agent, or Firm* — G. Peter Nichols; Brinks Gilson & Lione

(57) ABSTRACT

A connecting device configured to rotatably connect a first main body and a second main body of an electronic apparatus includes a rotating mechanism rotatably connecting the first main body and the second main body. A coating mechanism covering at least a part of the rotating mechanism is provided and a supporting component is provide to support an inner side wall of the coating mechanism so that the coating mechanism is bent without folds or crumples as the rotating mechanism is rotated. The connecting device improves man-machine interaction and enables the user to enjoy a better experience.

21 Claims, 15 Drawing Sheets

(56) References Cited

U.S. PATENT DOCUMENTS

| | | | | |
|---|---|---|---|---|
| 7,593,524 B2* | 9/2009 | Maenpaa | ............ | H04M 1/0216 379/433.13 |
| 7,596,395 B2* | 9/2009 | Gartrell | ............... | H04M 1/0216 379/433.13 |
| 8,005,521 B2* | 8/2011 | Cho | ................... | H04M 1/0216 379/433.13 |
| 8,134,829 B2* | 3/2012 | Clark | ................... | G06F 1/1681 16/382 |
| 8,208,249 B2* | 6/2012 | Chin | ................... | G06F 1/1618 361/679.27 |
| 8,438,702 B2* | 5/2013 | Apgar | ................... | B32B 25/10 16/225 |
| 9,557,772 B1* | 1/2017 | Xin | ....................... | G06F 1/1652 |
| 2002/0023314 A1* | 2/2002 | Goldsmith | ............. | E05D 3/186 16/372 |
| 2004/0266502 A1* | 12/2004 | Holtorf | .................... | B32B 3/04 455/899 |
| 2007/0297125 A1* | 12/2007 | Maatta | ................ | H04M 1/0216 361/679.01 |
| 2011/0157780 A1* | 6/2011 | Wang | .................... | G06F 1/1681 361/679.01 |
| 2013/0321987 A1* | 12/2013 | Ore Yang | .............. | G06F 1/1628 361/679.01 |
| 2014/0196254 A1* | 7/2014 | Song | ........................ | E05D 3/14 16/302 |
| 2014/0245569 A1* | 9/2014 | Cho | ........................ | E05D 3/122 16/370 |
| 2015/0131222 A1* | 5/2015 | Kauhaniemi | ......... | G06F 1/1652 361/679.27 |
| 2015/0176317 A1* | 6/2015 | Lee | ........................... | E05D 3/06 16/251 |
| 2015/0361696 A1* | 12/2015 | Tazbaz | .................. | H04M 1/022 361/679.27 |
| 2016/0224072 A1* | 8/2016 | Huang | ..................... | E05D 7/06 |
| 2016/0342180 A1* | 11/2016 | Xin | ....................... | G06F 1/1616 |
| 2016/0363964 A1* | 12/2016 | Shi | ........................ | G06F 1/1681 |
| 2017/0023985 A1* | 1/2017 | Xin | ........................ | G06F 1/1681 |

* cited by examiner

CONNECTING DEVICE AND AN ELECTRONIC APPARATUS

This application claims priority to Chinese Patent Application No. 201510432334.0 filed on Jul. 21, 2015 and to Chinese Patent Application No. 201510432393.8 filed on Jul. 21, 2015; the entire contents of which are incorporated herein by reference.

The present disclosure relates to an electronic apparatus, in particular to a connecting device used for the electronic apparatus.

BACKGROUND

In the present era, science and technology is rapidly changing people's life style, wherein the improvement of electronic apparatuses is one of the crucial factors. Electronic apparatuses become more and more intelligent and bring a comfortable and convenient life for us. In addition, their man-machine interaction becomes better increasingly. For example, the structures of electronic apparatuses are optimized and esthetic in appearance increasingly.

Common electronic apparatuses, such as laptop PCs, tablet PCs, and cell phones, etc., usually include a first main body and a second main body that can rotate in relation to each other and are connected to each other via a connecting device. The applicant has been engaged in the research, development, and manufacturing of electronic apparatuses for long, and has made extensive and in-depth researches on electronic apparatuses and their connecting devices described above. For example, the applicant has put forth a connecting device that is usually referred to as a "watch band hinge". The applicant has found that the existing connecting devices have drawbacks and must be improved further.

For example, folds and crumples may occur on the compressed surfaces of the connecting device when the first main body and the second main body are folded. When folds and crumples occur at the first main body and the second main body, not only may the connecting device be degraded quickly, but also inconvenience is introduced in the use of the apparatus and the appearance of the apparatus is compromised.

Hence, it is necessary to further optimize the connecting device for electronic apparatus, so as to improve product quality and man-machine interaction. Of course, generally there is always a demand for new solutions for electronic apparatuses.

SUMMARY

An object of the present disclosure is to provide an improved connecting device, to prevent occurrence of folds and crumples on compressed surfaces, and thereby improve man-machine interaction and enable the user to enjoy a better experience.

Another object of the present disclosure is to provide an improved electronic apparatus, which employs the connecting device disclosed in the present disclosure to improve product quality.

Accordingly, the present disclosure provides a connecting device configured to rotatably connect a first main body and a second main body of an electronic apparatus, the connecting device comprising: a rotating mechanism rotatably connecting the first main body and the second main body; a coating mechanism covering at least a part of the rotating mechanism; and a supporting component supporting an inner side wall of the coating mechanism so that the coating mechanism is bent without folds or crumples as the rotating mechanism is rotated.

The present disclosure further provides an electronic apparatus comprising the connecting device disclosed in the present disclosure, wherein at least one of the first main body and the second main body is fitted with a display screen, or the first main body and the second main body are fitted with an integral display screen, which can be bent freely at a part corresponding to the connecting device.

DETAILED DESCRIPTION

Figure 1:
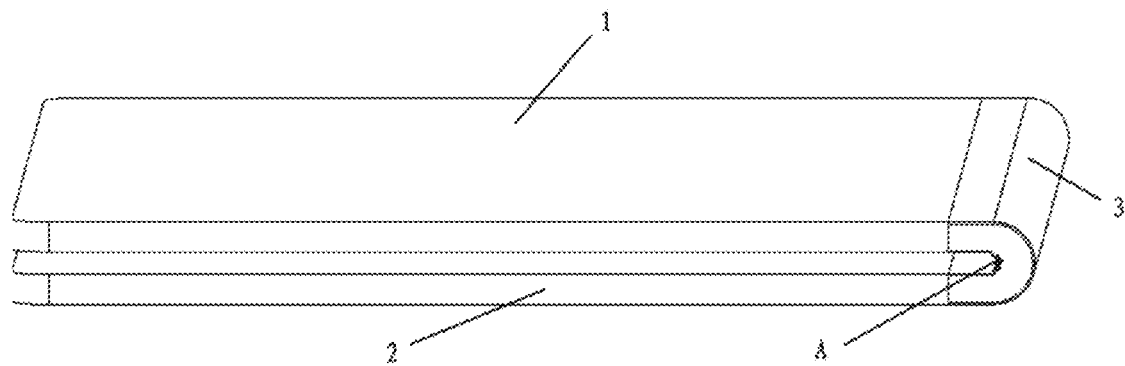
FIG. 1 is a 3D view of an electronic apparatus in the related art.

Hereinafter some embodiments of the connecting device provided in the present disclosure will be detailed with reference to the accompanying drawings.

The embodiments described here are specific embodiments of the present disclosure, and are provided only to explain the ideal of the present disclosure. All these embodiments are explanatory and exemplary, and shall not be interpreted as constituting any limitation to the embodiments and the scope of the present disclosure.

The accompanying drawings are schematic diagrams, which are provided to aid the description of the ideal in the present disclosure and schematically illustrate the shapes of the parts and the relations among the parts. It should be noted that the accompanying drawings may not be drawn at the same scale, for the purpose of clearly presenting the structures of the components in the embodiments of the present disclosure. Similar reference marks are used in the drawings to denote similar elements. In addition, in the description made with reference to the accompanying drawings, terms that denote directions or orientations, such as "top", "bottom", "front", and "back", etc., are used for the convenience of expression, but they don't constitute any particular limitation to the structures of the features.

Figure 2:
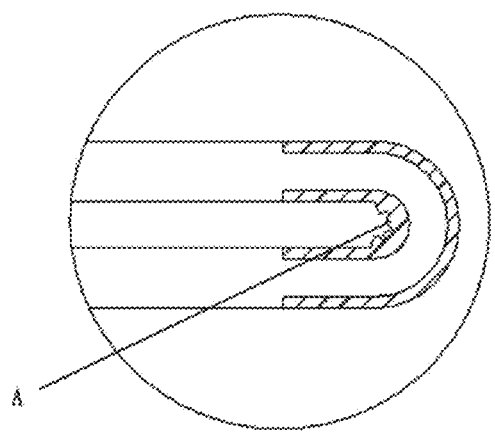
FIG. 2 is a partially enlarged view of the structure shown in FIG. 1.

FIG. 1 and FIG. 2 show a problem in the connection between the main bodies of an existing electronic apparatus, wherein FIG. 2 is a partially enlarged view of the structure shown in FIG. 1. The apparatus shown in FIG. 1 includes a display side 1 and a system side 2, i.e., a first main body and a second main body, which are connected together via a connecting device 3. It can be seen in FIG. 1 and FIG. 2: folds and crumples may occur on the compressed surfaces of the connecting device 3 when the display side 1 and the system side 2 are folded. When folds and crumples occur at the display side 1 and the system side 2, not only the connecting device 3 may be degraded quickly, but also inconvenience is introduced in the use of the apparatus and the appearance of the apparatus is compromised.

Figure 3:
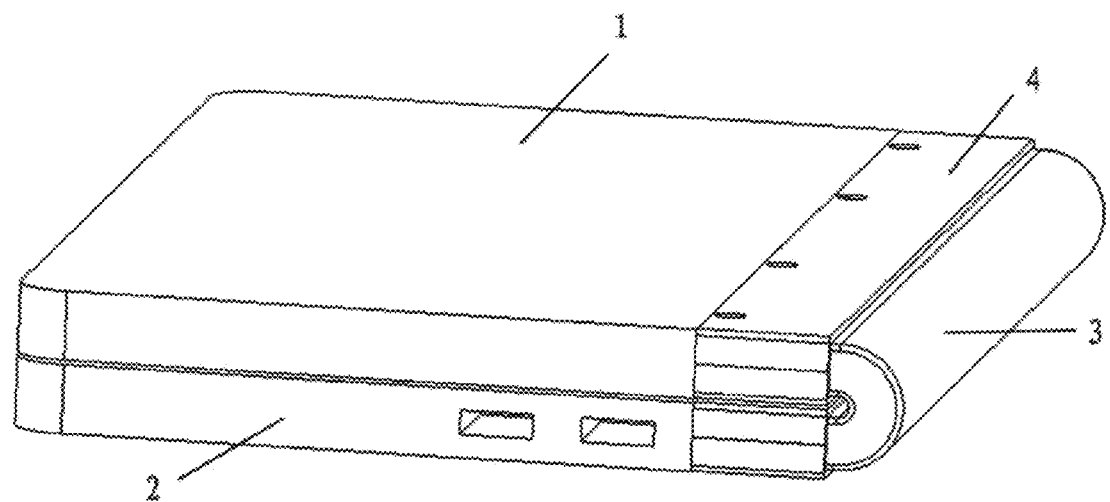
FIG. 3 is a 3D view of an embodiment of the electronic apparatus according to the present disclosure.

FIG. 3 is a 3D view of an embodiment of the electronic apparatus disclosed in the present disclosure. The electronic apparatus includes a first main body 1, a second main body 2, and a connecting device 3 configured to rotatably connect the first main body 1 and the second main body 2, with pressing plates 4 configured to fix the connecting device 3 to the first main body 1 and the second main body 2 respectively. In this embodiment, the first main body 1 and the second main body 2 can be particularly embodied as a display side configured to display desired contents and a system side configured to manipulate the electronic apparatus.

First Embodiment of the Connecting Device of the Electronic Apparatus According to the Embodiment A first embodiment of the connecting device employs a supporting component to attain the object of the present disclosure. Please see FIGS. 4-11. First, an electronic apparatus with a first type of supporting components according to the present disclosure will be described hereinafter.

Figure 4:
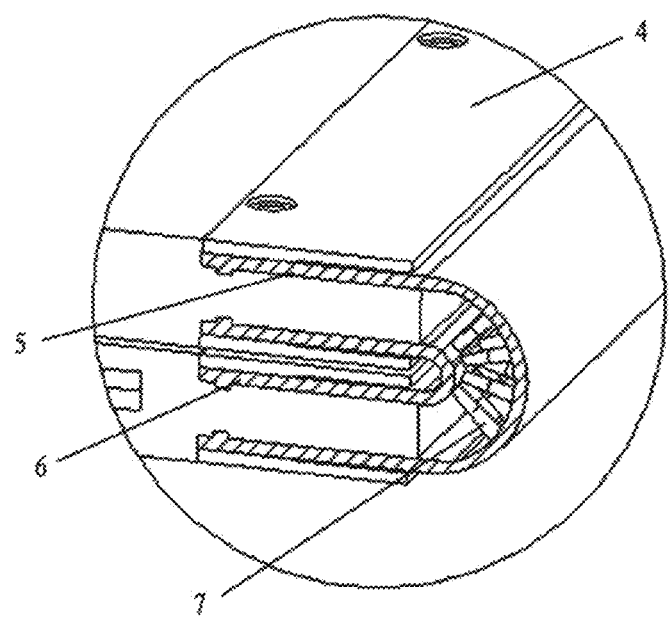
FIG. 4 is a partially enlarged 3D sectional view of the structure shown in FIG. 3, showing a first embodiment of the connecting device according to the present disclosure.

As shown in FIG. 4, the connecting device 3 includes a first coating element 5, a second coating element 6, and a first type of supporting components 7 that connect the inner side walls of the first coating element 5 and second coating element 6. The supporting components 7 are in a cylindrical shape when they are not compressed, as shown in the coating mechanism 3 in a 180° unfolded state in FIG. 8. The connecting device 3 further includes a rotating mechanism 8 not shown in FIG. 4. But it should be noted that the rotating mechanism 8 is shown in FIGS. 9, 11, 12, and 18.

The rotating mechanism 8 in the connecting device 3 disclosed in the present disclosure can employ any structure known in the related art. The rotating mechanism 8 may have at least rotation axis in the axial direction, namely, the transverse direction of the electronic apparatus, and the rotation axes may be parallel to each other. The rotating mechanism 8 is in a strip shape generally. In the accompanying drawings, the rotating mechanism 8 is particularly embodied as a hinge, i.e., the so-called "watch band hinge" put forth by the applicant. As shown in FIGS. 9, 11, 12, and 18, the "watch band hinge" is formed into a strip shape generally. Since the rotating mechanism 8 is in a strip shape generally, both the first coating element 5 and the second coating element 6 that cover the outer sides of the rotating mechanism 8 have certain planar surface area. The larger the planar surface area is, the higher the possibility of occurrence of folds or crumples on the compressed coating elements will be, when the rotating mechanism 8 is bent.

Figure 9:
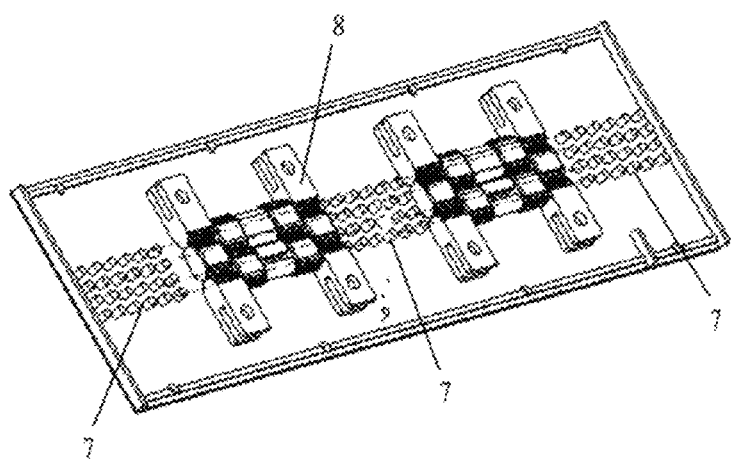
FIG. 9 is a schematic diagram of the internal structure of the connecting device comprising a first type of supporting components according to the present disclosure in an unfolded state, wherein a coating element is removed.
Figure 12:
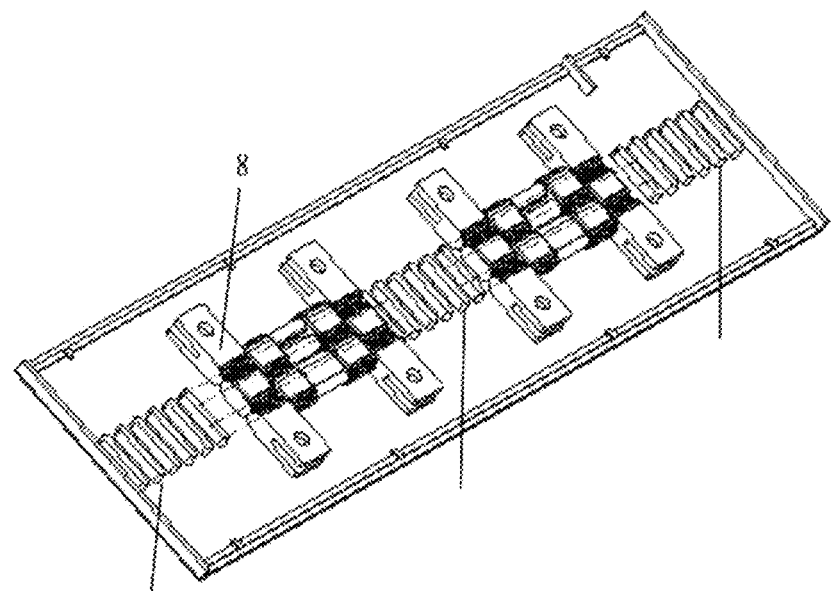
FIG. 12 is a schematic diagram of the internal structure of the connecting device comprising a second type of supporting components according to the present disclosure in an unfolded state, wherein a coating element is removed.
Figure 18:
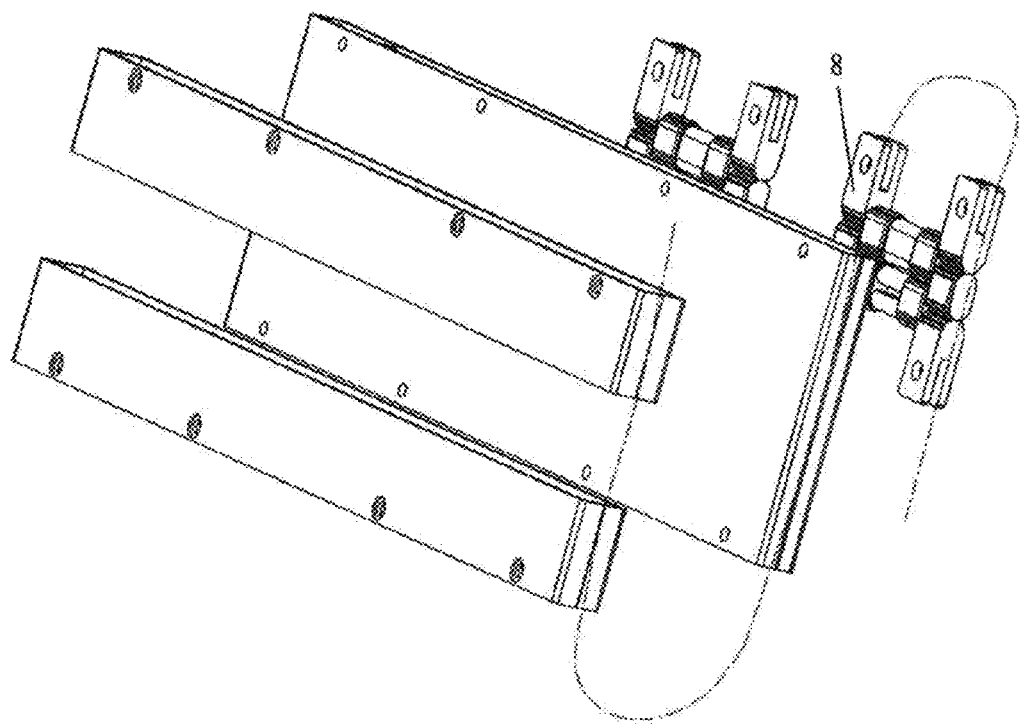
FIG. 18 is a 3D exploded view of the connecting device shown in FIG. 17.

The hinge is shown as having 2 sections in FIGS. 9, 12, and 18. It should be noted that the number of sections in the hinge shown in the accompanying drawings is only exemplary. In actual implementation, the number of sections can be determined according to the design requirement, and can be a natural number such as 1, 2, 3, 4, 6, 7, 8, alternatively. The structure of the rotating mechanism 8 will not be further detailed here. In brief, a structure known in the related art can be used for it.

Figure 5:
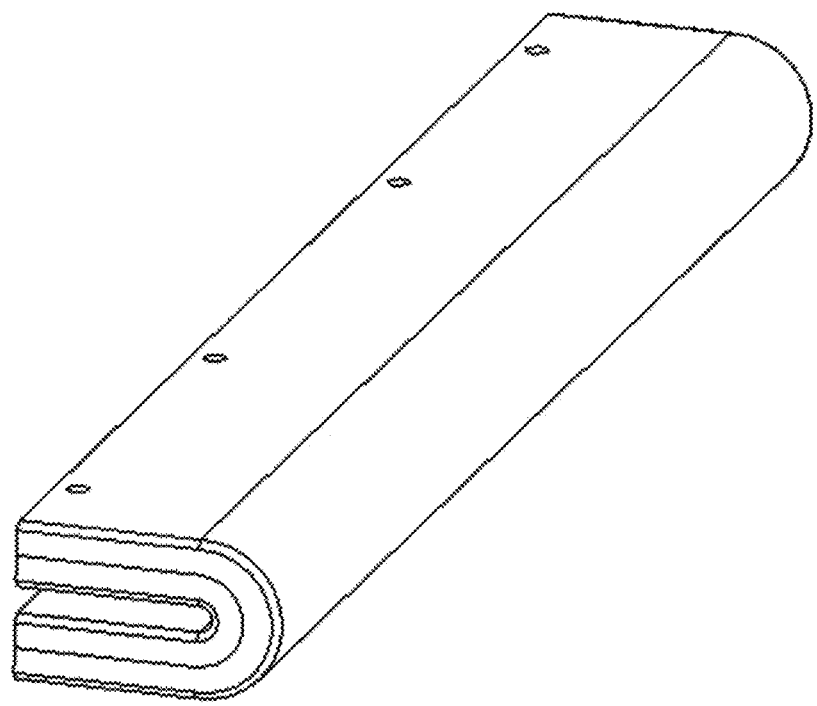
FIG. 5 is a 3D view of the coating mechanism comprising a first coating element and a second coating element in the first embodiment of the connecting device according to the present disclosure in a folded state.
Figure 6:
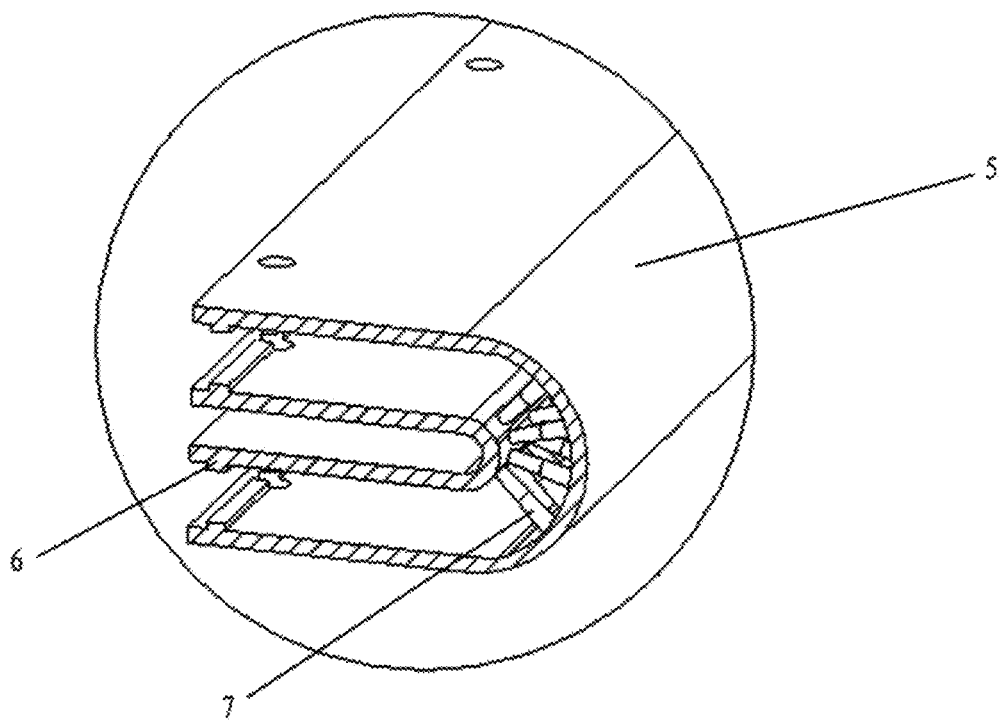
FIG. 6 is a partially enlarged 3D sectional view of the structure shown in FIG. 5, showing a first type of supporting components.

FIG. 5 is a 3D view of the coating mechanism comprising a first coating element and a second coating element in the first embodiment of the connecting device according to the present disclosure in a folded state; FIG. 6 is a partially enlarged 3D sectional view of the structure shown in FIG. 5, showing supporting components 7. In addition, the first coating element 5 and the second coating element 6 can also be seen clearly in FIG. 6.

Please see FIGS. 3, 4, 9, and 11. The rotating mechanism 8 is fixedly connected to the first main body 1 and the second main body 2 via its connecting ends arranged in the transverse direction of the electronic apparatus, and the pressing plates 4 are fixed to the first main body 1 and the second main body 2 by fastening pieces (e.g., bolts) inserted into the through-holes in the pressing plates 4 and the first coating element 5 and the second coating element 6. In the illustrated embodiment, these through-holes are also arranged in the transverse direction of the electronic apparatus.

Figure 7:
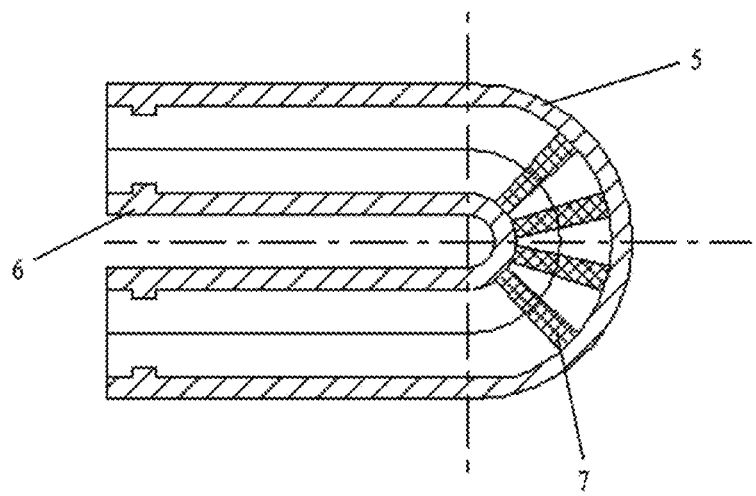
FIG. 7 is a planar sectional view of the structure shown in FIG. 5, showing a first type of supporting components.
Figure 8:
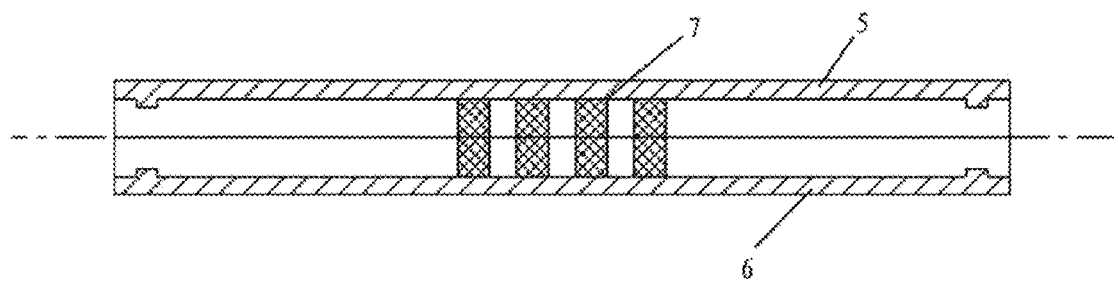
FIG. 8 is a planar sectional view of the coating mechanism shown in FIG. 7 in an unfolded state.

FIGS. 7, 8, 9, and 10 further show the structure of and the positional relation among the supporting components 7. When the coating elements are not subjected to compression and stretching, i.e., both the first coating element 5 and the second coating element 6 are not subjected to compression, as shown in FIG. 8, the supporting components 7 are in a cylindrical shape.

In contrast, when the coating elements are subjected to compression and stretching, i.e., both the first coating element 5 and the second coating element 6 are bent, for example, when the coating mechanism 3 is in a folded state as shown in FIG. 7 (namely, the first main body 1 and the second main body 2 are in a folded state accordingly), one coating element is stretched, while the other coating element is compressed. Apparently folds or crumples will not occur on a stretched coating element, but, in the related art, folds or crumples may occur on a compressed coating element. In FIG. 7, at the bending part, the first coating element 5 is subjected to stretching, while the second coating element 6 is subjected to compression. Since the supporting components 7 are connected to the inner side walls of the first coating element 5 and the second coating element 6 at least at the bending part, the second coating element 6 is under the tension force of the supporting components 7 when it is subjected to compression, and thereby no folds or crumples occur on the second coating element 6 at the bending part. Hence, the second coating element 6 can be bent smoothly when the rotating mechanism 8 is rotated, and thereby the occurrence of folds or crumples on the coating mechanism 3 can be prevented when the rotating mechanism 8 is rotated.

As shown in FIG. 7, when the coating mechanism 3 is bent, one end of the supporting component 7 near the tensioned coating element will be tensioned radially and thereby expand, while the other end of the supporting component 7 near the compressed coating element will be compressed radially and thereby shrink.

Figure 10:
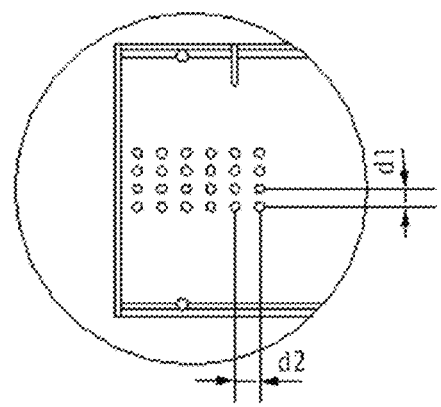
FIG. 10 is a partially enlarged view of the structure shown in FIG. 9, showing the positional relation among the first type of supporting components.
Figure 11:
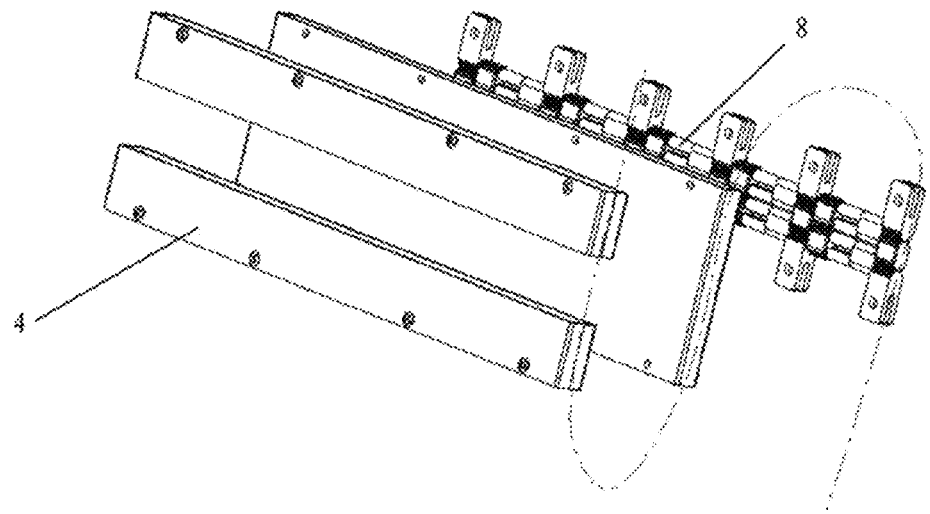
FIG. 11 is a 3D exploded view of the connecting device shown in FIG. 9.

Please see FIGS. 9 and 10 further, the supporting components 7 are arranged into 4 rows exemplarily along the bending part of the coating mechanism 3, and are divided into three groups corresponding to the structure of the rotating mechanism 8. The longitudinal spacing and transverse spacing among the supporting components 7 are set to d1 and d2 respectively. However, it should be noted that such an arrangement is only exemplary. The grouping and arrangement of the supporting components 7 can be determined according to actual design requirements, as long as such grouping and arrangement can avoid the occurrence of folds or crumples on the coating mechanism 3. That is to say, the quantity and arrangement of the supporting components 7 can be changed according to actual design requirements. For example, the supporting components 7 can be arranged into 1 row, or 2, 5, 6, 7 rows, etc. In addition, the spacing among the columns (including longitudinal spacing and transverse spacing) may be different, depending on the material of the supporting components 7; moreover, the supporting components 7 can be distributed in a way that both the longitudinal spacing and the transverse spacing are unequal, or even the supporting components 7 are not aligned in lines, i.e., they are staggered.

It should be noted particularly: through the supporting components 7 are not shown as being distributed at positions corresponding to an axial section in FIG. 9, actually they can be distributed at positions corresponding to an axial section, i.e., the supporting components 7 can be arranged as passing through the rotating device 8 at positions on the periphery of the rotating device or through a gap in the middle of the rotating device, or through through-holes specially arranged in the rotating device 8 for the supporting components 7 to pass.

Hereunder a connecting device having a second type of supporting components 7' according to the present disclosure will be described with reference to FIGS. 12-16.

Figure 13:
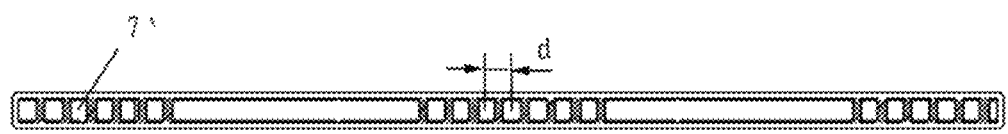
FIG. 13 is a sectional view showing the positions of and relation among the second type of supporting components shown in FIG. 12.
Figure 14:
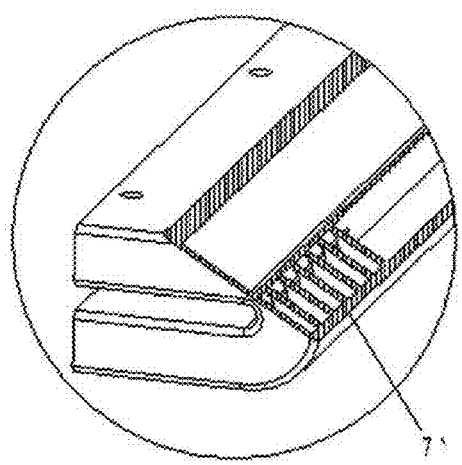
FIG. 14 is a 3D enlarged sectional view of the coating mechanism in FIG. 5, which comprises the second type of supporting components.
Figure 15:
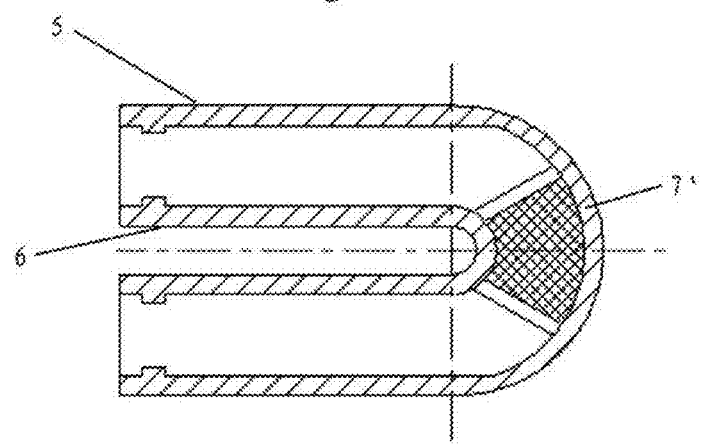
FIG. 15 is a planar sectional view of the structure shown in FIG. 5, showing the second type of supporting components.
Figure 16:
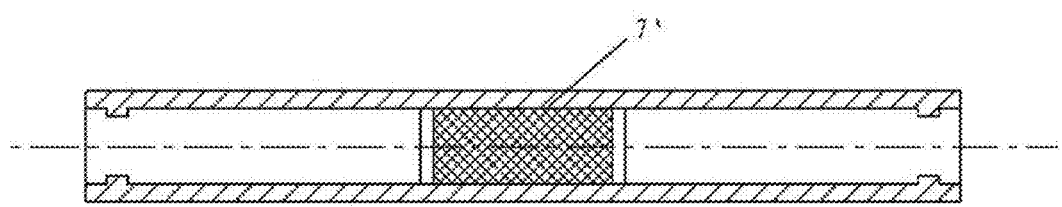
FIG. 16 is a planar sectional view of the coating mechanism shown in FIG. 15 in an unfolded state.

FIG. 12 is a schematic diagram of the internal structure of the connecting device in an unfolded state, wherein a coating element is removed; FIG. 13 is a sectional view showing the positions of and relation among the supporting components 7' shown in FIG. 12. FIG. 15 is a planar sectional view of the coating mechanism in a 180° folded state, showing the supporting components 7' in that state; FIG. 16 is a planar sectional view of the coating mechanism shown in FIG. 5 in an unfolded state. FIG. 14 shows a 3D sectional view of the structure shown in FIG. 5, in order to present the shape of and positional relation among the supporting components 7' more clearly.

As shown in FIG. 12, the second type of supporting components 7' are also connected between the inner side walls of the two coating elements at the bending part of the coating mechanism, but, compared with the cylindrical supporting components 7 in the first embodiment, the difference is: the second type of supporting components 7' has a long bar-like cross-section with a lengthwise direction in the longitudinal direction of the electronic apparatus. Particularly, in the accompanying drawings, the supporting component 7' can be seen as having an oblong cross-section with the two arcuate ends and a rectangular middle portion there between. Of course, the bar-like shape of the supporting components 7' is not limited to the shape shown in the drawings. Those skilled in the art can design different bar-like shapes as required. For example, the bar-like shape can be designed as having a chamfered rectangular shape or even a non-chamfered rectangular shape at both ends, or the bar-like shape can be in a wavy shape in the lengthwise direction.

The technical effect and design concept of the supporting component 7' are virtually the same as those of the supporting component 7, except the difference in the shape of structure. Hence, the design concept of the supporting component 7 can be applied to the supporting component 7' similarly. Therefore, for the supporting component 7, reference can be made to the above description of the supporting component 7. Hereunder only two aspects will be explained.

As shown in FIG. 15 and FIG. 16, since a plurality of supporting components are unnecessary in the longitudinal direction of the electronic apparatus, only one supporting component 7' exists in the plan views in FIG. 15 and FIG. 16. In FIG. 15, at the bending part, the first coating element 5 is subjected to stretching, while the second coating element 6 is subjected to compression. Since the supporting components 7' are connected to the inner side walls of the first coating element 5 and the second coating element 6 at least at the bending part, the second coating element 6 is under the pulling action of the first coating element 5 by virtue of the connection with the supporting components 7' when it is subjected to compression, and thereby no folds or crumples occur on the second coating element 6 at the bending part. The principle of the action is identical to that of the supporting components 7. Hence, the coating mechanism 3 in the present disclosure is beneficial for smooth bending of the rotating mechanism 8 in the rotating operation, and can prevent folds or crumples on the coating mechanism 3 when the rotating mechanism 8 is rotated.

Please see FIG. 13. A plurality of supporting components 7' is arranged along the transverse direction of the electronic apparatus, forming spacing d between the supporting components 7'. Similar to the case of the supporting component 7, the arrangement of the supporting component 7' as shown in FIGS. 12-16 is only exemplary. The grouping, quantity, and arrangement of the supporting components 7' can be determined according to actual design requirements, as long as such grouping, quantity and arrangement can avoid the occurrence of folds or crumples on the coating mechanism 3. In addition, the spacing between the supporting components 7' may be different, depending on the material and hardness of the supporting components 7', and even the distribution of the supporting components 7' may be an unequally spaced one. Moreover, the supporting components 7 may not be aligned in lines, i.e., they are staggered.

Figure 17:
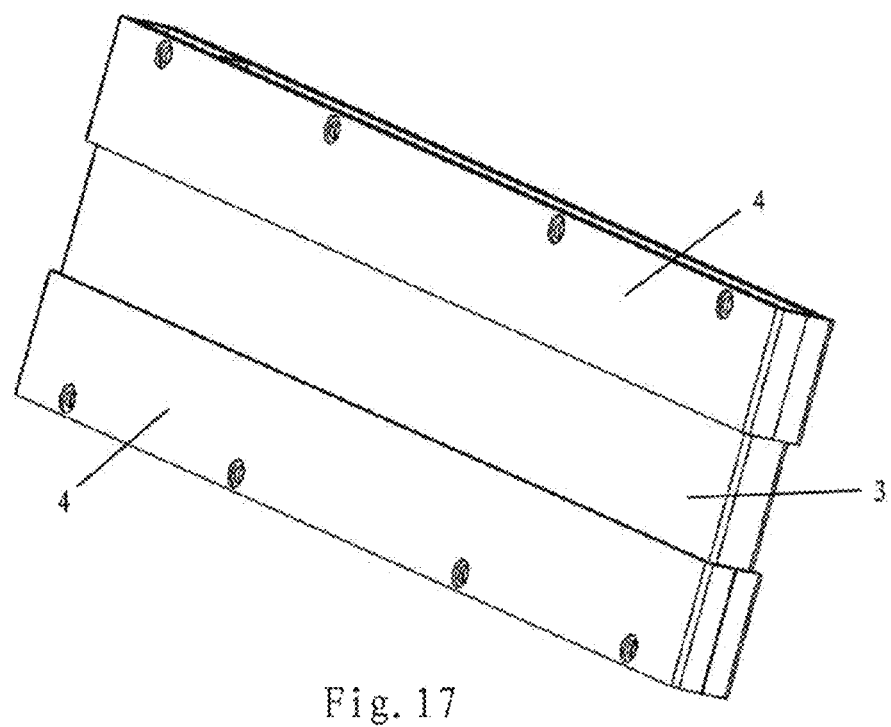
FIG. 17 is a 3D view of a connecting device comprising a first coating element and a second coating element integrally in a 180° unfolded state.

In the description of the previous embodiment, the coating mechanism 3 includes two separate coating elements (the first coating element 5 and the second coating element 6), which can be connected via the supporting components. Actually, the first coating element 5 and the second coating element 6 may be integral, as shown in FIG. 17 and FIG. 18. Thus, even if the supporting components are removed, the first coating element 5 and the second coating element 6 are an integral piece.

In addition, in the description of the present disclosure, though the coating mechanism 3 and the rotating mechanism 8 are described as two separate members, those skilled in the art would appreciate that the coating mechanism 3 and the rotating mechanism 8 can be manufactured by integral molding, so as to form the connecting device disclosed in the present disclosure.

In the present disclosure, the first coating element 5 and the second coating element 6 of the coating mechanism 3 and the supporting components can be made of the same material or made of different materials. The coating mechanism 3 provides functions of protection, connection, and esthetic appearance. It can be made of any suitable organic material with appropriate toughness and elasticity, such as silica gel.

Though the through-holes for fixing purpose in the coating mechanism 3 are described as circular holes in the accompanying drawings, alternatively the coating mechanism 3 can be configured to have elongated holes for fixing purpose, the lengthwise direction of which is in the longitudinal direction of the electronic apparatus, in order to provide some freedom for the movement of the first coating element 5 and the second coating element 6 of the coating mechanism 3 during bending, so that the first coating element 5 and the second coating element 6 can slide in the longitudinal direction of the electronic apparatus during bending. On that basis, those skilled in the art can design a coating mechanism 3 with a different bending pattern.

Second Embodiment of the Connecting Device of the Electronic Apparatus According to the Embodiment A second embodiment of the connecting device attains the object of the present disclosure by utilizing a feature that the strength of the inner side wall of the coating mechanism is lower than that of the outer side wall of the coating mechanism. Specifically, for example, the strength of a first material used to produce the inner side wall of the coating mechanism is lower than that of a second material used to produce the outer side wall of the coating mechanism, or at least one groove can be arranged on the inner side wall of the coating mechanism, so that the strength of the inner side wall is lower than that of the outer side wall.

Thus, compared with the first embodiment of the connecting device according to the present disclosure, in the second embodiment of the connecting device according to the present disclosure, the connection between the connecting device and the first main body and the second main body, the material of the coating mechanism, and the structure of the rotating mechanism can be the same as those in the first embodiment, except that the supporting components is replaced by the feature that the strength of the inner side wall of the coating mechanism is lower than that of the outer side wall of the coating mechanism. Moreover, reference can be made to FIG. 17 and FIG. 18 for the external view and exploded view of the second embodiment of the connecting device. Hence, to simplify the description, hereunder the feature that the strength of the inner side wall of the coating mechanism is lower than that of the outer side wall, which is the difference from the first embodiment, will be mainly described, while all aspects that are the same as those in the first embodiment will not be described whenever possible. Reference can be made to the description of the first embodiment for those aspects.

Figure 19:
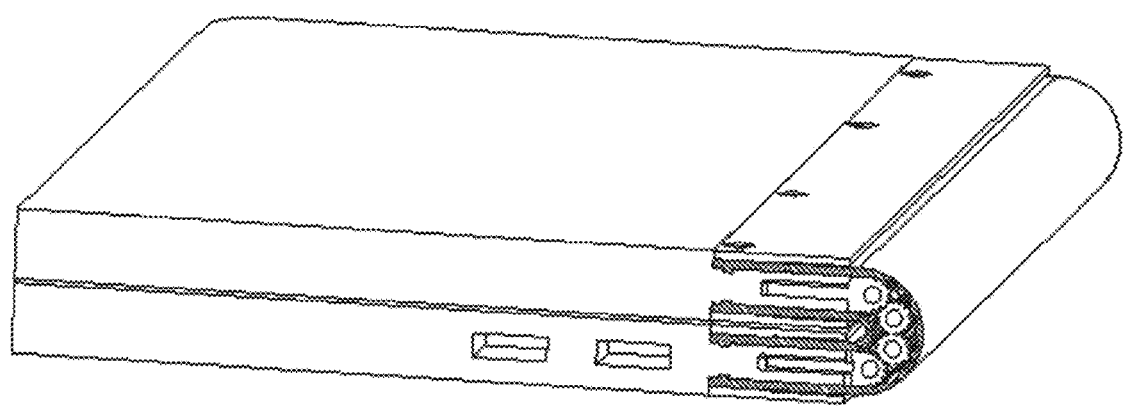
FIG. 19 is a 3D view of the structure in FIG. 3 with a partial section, showing a second embodiment of the connecting device according to the present disclosure.
Figure 20:
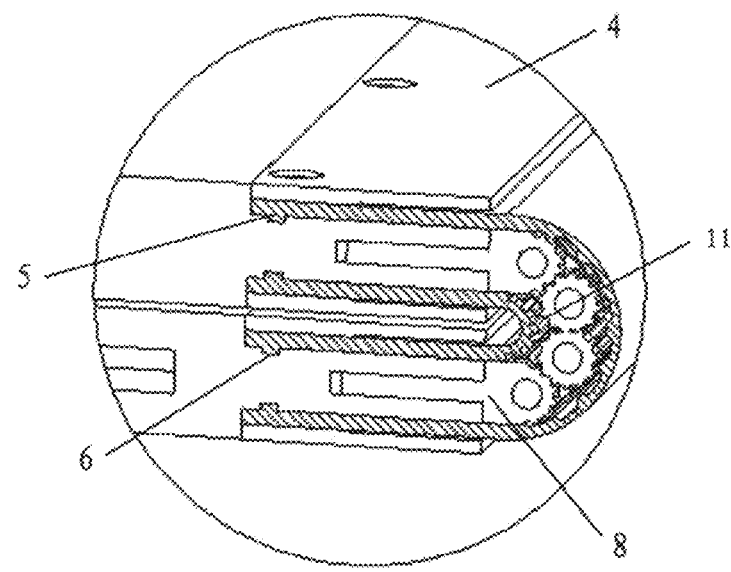
FIG. 20 is a partially enlarged view of the structure shown in FIG. 19.

As shown in FIG. 19 and FIG. 20, the connecting device 3 includes a first coating element 5, a second coating element 6, and a plurality of grooves 11 extending along the transverse extension of the connecting device 7 on the inner side walls of the first coating element 5 and the second coating element 6. The grooves 11 are arranged at the bending parts of the first coating element 5 and the second coating element 6.

Figure 21:
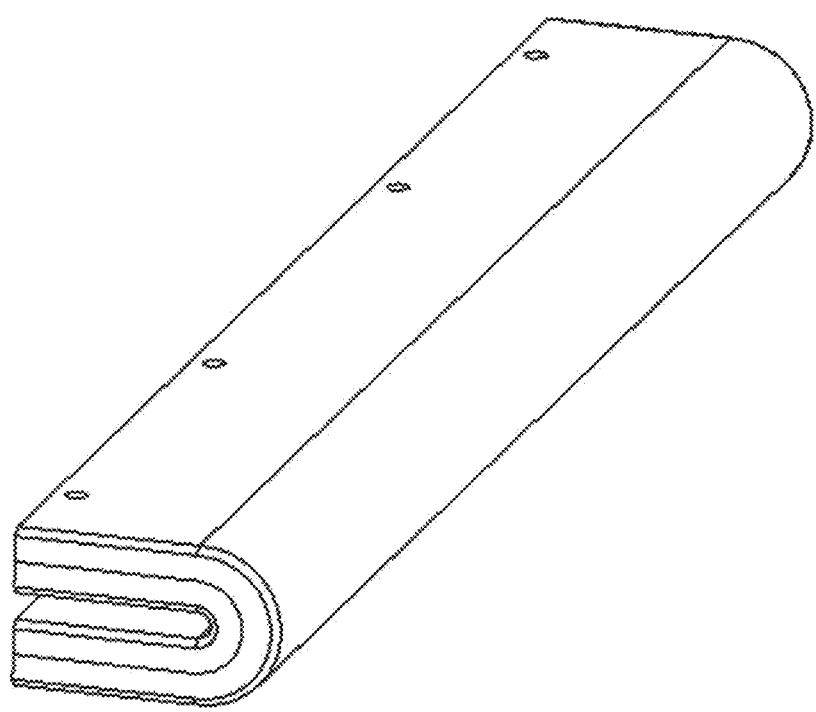
FIG. 21 is a 3D view of the coating mechanism comprising a first coating element and a second coating element in the second embodiment of the connecting device according to the present disclosure in a folded state.
Figure 22:
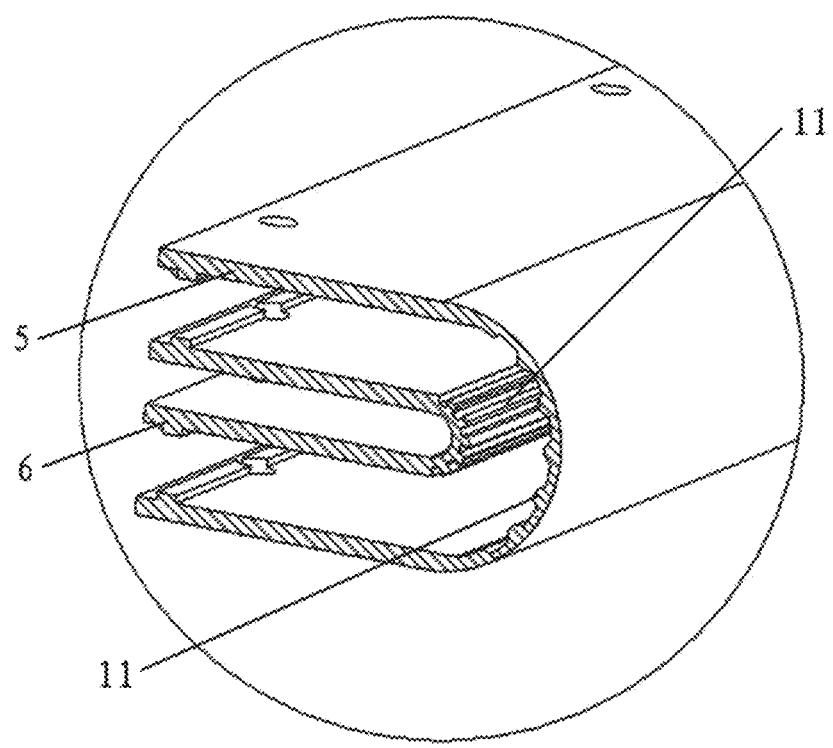
FIG. 22 is a partially enlarged 3D sectional view of the structure shown in FIG. 21.
Figure 23:
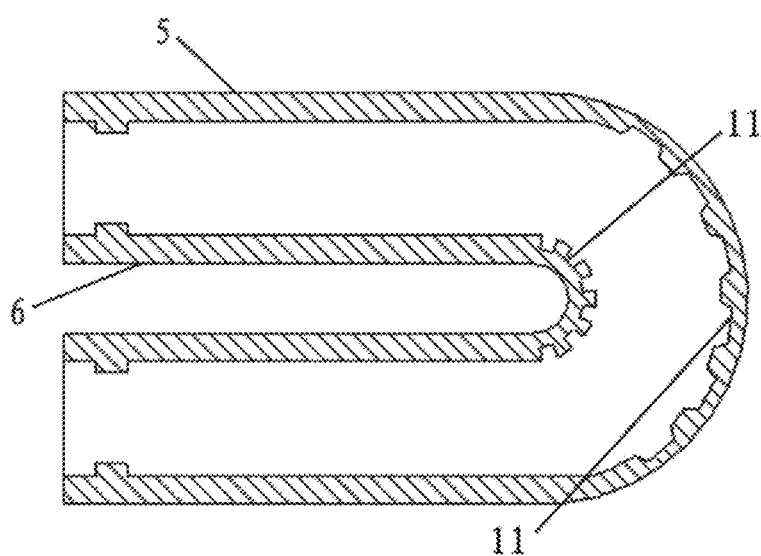
FIG. 23 is a planar sectional view of the structure shown in FIG. 21.

Furthermore, FIG. 21 is a 3D view of the coating mechanism comprising a first coating element and a second coating element in the connecting device in this embodiment. FIG. 22 is a partially enlarged 3D sectional view of the structure shown in FIG. 21, and FIG. 23 is a planar sectional view of the structure shown in FIG. 21, showing the grooves 11 arranged on the two inner side walls (the inner side wall of the first coating element 5 and the inner side wall of the second coating element 6) more clearly.

Figure 24:
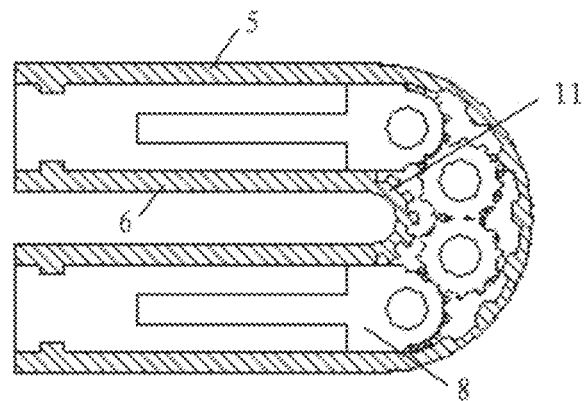
FIG. 24 is a planar sectional view of the internal structure of the components of the coating mechanism and rotating mechanism according to the present disclosure in a 0° folded state.
Figure 25:
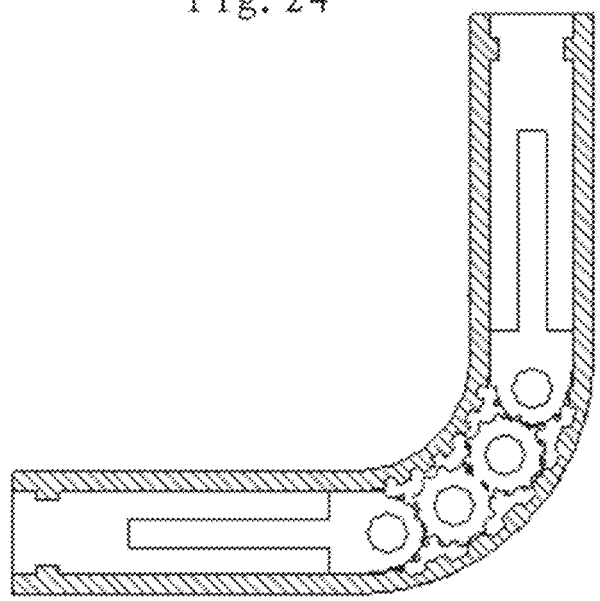
FIG. 25 is a planar sectional view of the internal structure of the components of the coating mechanism and rotating mechanism according to the present disclosure in a 90° unfolded state.
Figure 26:
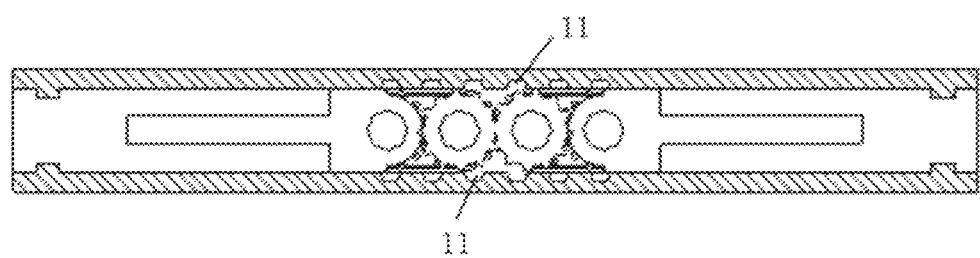
FIG. 26 is a planar sectional view of the internal structure of the components of the coating mechanism and rotating mechanism according to the present disclosure in a 180° folded state.
Figure 27:
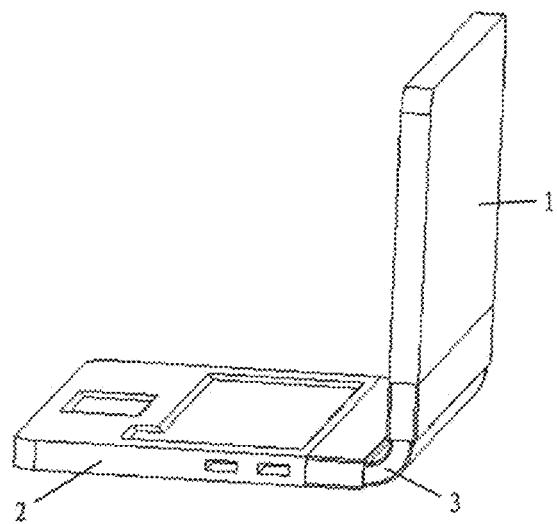
FIG. 27 shows the electronic apparatus in FIG. 3 in a 90° state.
Figure 28:
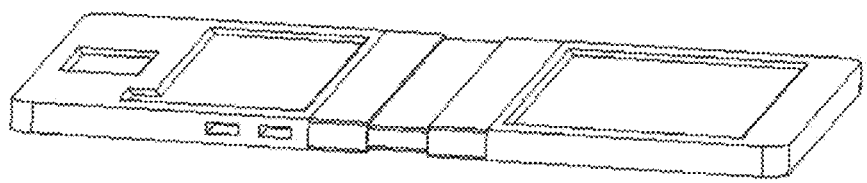
FIG. 28 shows the electronic apparatus in FIG. 3 in a 180° unfolded state.
Figure 29:
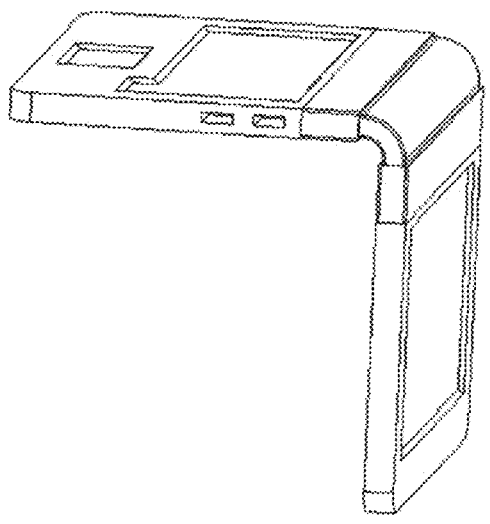
FIG. 29 shows the electronic apparatus in FIG. 3 in a 270° state.
Figure 30:
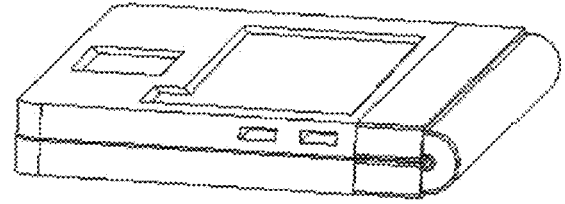
FIG. 30 shows the electronic apparatus in FIG. 3 in a 360° state.

FIGS. 24-26 show the structure of and positional relation among the components of the coating mechanism 3 and the rotating mechanism 8 according to the present disclosure. FIG. 24 is a planar sectional view of the internal structure of the components of the coating mechanism 3 and rotating mechanism 8 according to the present disclosure in a 0° folded state; FIG. 25 shows the internal structure of the components of the coating mechanism 3 and the rotating mechanism 8 in a 90° unfolded state; FIG. 26 shows the internal structure of the components of the coating mechanism 3 and the rotating mechanism 8 in a 180° folded state.

In the state shown in FIG. 26, the coating mechanism 3 is not compressed or stretched; i.e., when both the first coating element 5 and the second coating element 6 are not subjected to compression, which corresponds to a neutral state of the rotating mechanism 8 in which the bent part of the rotating mechanism 8 is not bent.

In contrast, when the coating elements are subjected to compression and stretching; i.e., when both the first coating element 5 and the second coating element 6 are bent, for example, when the coating mechanism 3 is in a bent state as shown in FIGS. 22-25 (namely, the first main body 1 and the second main body 2 are at an angle in relation to each other accordingly), one coating element is stretched, while the other coating element is compressed. Apparently folds or crumples will not occur on a stretched coating element, but, in the related art, folds or crumples may occur on a compressed coating element.

In the superposed and folded state shown in FIGS. 22-24, at the bending part, the first coating element 5 is subjected to stretching, while the second coating element 6 is subjected to compression. Since the grooves 11 are arranged on the inner side wall of the second coating element 6 corresponding to the bending part, the strength of the part of the inner side wall with grooves 11 is not only lower than the strength of other parts of the inner side wall but also lower than the strength of the outer side wall at the opposite side of the part of the second coating element 6 with grooves 11, and may be bent more easily. Thus, when the second coating element 6 is in a bent state, the bending part of the second coating element 6 tends to bend inwardly under compression, owing to the existence of the grooves 11. Hence, no folds or crumples will occur on the second coating element 6 at the bending part. In addition, since the inner side walls of the first coating element 5 and the second coating element 6 are provided with grooves 11 corresponding to the bending part, no folds or crumples will occur on the compressed coating element at the bending part, no matter whether the coating mechanism 3 is folded at 0° or is folded at 360°. Hence, the arrangement of the grooves 11 is beneficial for smooth bending of the rotating mechanism 8 in the rotating operation, and can prevent folds or crumples on the coating mechanism 3 when the rotating mechanism 8 is rotated.

In the drawings described above, 6 grooves 11 parallel to each other are shown exemplarily as being arranged essentially on the entire bending part of the coating mechanism 3. Apparently, such a specific arrangement in the embodiment shown in the accompanying drawings is only illustrative and explanatory. The quantity, arrangement, and shape of the grooves 11 can be determined according to actual design requirements. A basic ideal of the present disclosure is to make the strength of the inner side wall of the coating element lower than that of the outer side wall of the coating element in the coating mechanism, so that the bending part of the coating element will tend to bend inwardly under compression, and thereby the occurrence of folds or crumples on the coating mechanism can be prevented. Hence, the quantity, arrangement, and shape of the grooves can be determined as required, as long as the basic ideal can be implemented. Thus it can be seen: according to the design requirements, the quantity of the grooves 11 can be a natural number, such as 1, 2, 5, 6, 7, . . . , the grooves 11 can be arranged parallel to the transverse direction of the connecting device or slightly deviate from the parallel direction, and the grooves 11 can have an equal distance or unequal distances between them. The grooves 11c are in a trapezoid shape, as shown in the drawings described above. However, there is no particular restriction on the shape of the grooves in the present disclosure, which is to say, the grooves 11 can be in any shape, such as rectangular, triangular, or arc shape, etc., as long as the strength of the inner side wall of the coating element is decreased and the inner side wall is prone to bend inwardly. The quantity, arrangement, and shape of the grooves 11 can be selected according to the material and hardness of the grooves 11. Moreover, the grooves 11 can run across the coating element in the transverse direction of the coating mechanism 3, or only occupy a portion of the coating element in the transverse direction; in addition, the grooves 11 can be continuous or discontinuous in the transverse direction. In a case that the coating mechanism 3 has a plurality of grooves 11 in its longitudinal direction, these grooves can be equal or unequal in length, and further can be arranged in a staggered manner in relation to the longitudinal direction. The grooves can be divided into discrete groups in the transverse direction of the coating mechanism 3.

In the embodiment described above, the coating mechanism 3 includes two coating elements, i.e., a first coating element 5 and a second coating element 6. The two coating elements can be separate pieces that are separate from each other, or can be an integral piece, for example, the two coating elements are connected into one piece at their ends in the longitudinal direction of the coating mechanism coating mechanism 3.

In addition, in the description of the present disclosure, though the coating mechanism 3 and the rotating mechanism 8 are described as two separate members, those skilled in the art would appreciate that the coating mechanism 3 and the rotating mechanism 8 can be manufactured and assembled with a variety of manufacturing and assembling techniques in the art. Particularly, for example, they can be manufactured by integral molding, so that the coating mechanism is attached to the rotating mechanism at least at some parts, to form the connecting device disclosed in the present disclosure.

In the present disclosure, the first coating element 5 and the second coating element 6 of the coating mechanism 3 can be made of the same material or made of different materials. The coating mechanism 3 provides functions of protection, connection, and esthetic appearance. It can be made of any suitable organic material with appropriate toughness and elasticity, such as silica gel.

While a first embodiment and a second embodiment of the connecting device for electronic apparatus according to the present disclosure are described above, those skilled in the art should appreciate that the first embodiment and the second embodiment of the connecting device are for the same object of the present disclosure, and they can be used in combination in the electronic apparatus according to the present disclosure; which is to say, the connecting device for electronic apparatus according to the present disclosure can use the supporting components and the feature that the strength of the inner side wall of the coating mechanism is lower than the strength of the outer side wall of the coating mechanism together to attain the object of the present disclosure.

To that end, based on the above description of the first embodiment and the second embodiment, it is seen that different arrangements can be used when the structure of supporting component and the feature that the strength of the inner side wall of the coating mechanism is lower than the strength of the outer side wall are utilized in combination.

For example, a set of the supporting components and a set of the grooves described in the present disclosure can be arranged alternatively along the transverse axis of the rotating mechanism; or, a set of the supporting components and a set of the grooves described in the present disclosure can be arranged alternatively in a direction orthogonal to the transverse axis of the rotating mechanism. For example, the connection of the supporting component with the inner side wall in the present disclosure can be a connection of the supporting component with a ridge of the groove. For example, the strength of a first material used to produce the inner side wall of the coating mechanism can have lower strength than a second material used to produce the outer side wall, and the supporting component can be connected to the inner side wall simply. In general, the combination of the structure of supporting component and the feature that the strength of the inner side wall of the coating mechanism is lower than that of the outer side wall can be designed according to actual design requirements, as long as the object of the present disclosure can be attained.

The rotating mechanism described in the present disclosure can avoid the occurrence of folds and crumples on the compressed surfaces of the coating mechanism, and thereby the rotation of the rotating mechanism is smoother and has high quality. Thus, the man-machine interaction can be improved, and the use can enjoy a better experience. As shown in FIGS. 27-30, with the rotating mechanism disclosed in the present disclosure, smooth and high-quality rotation up to 360° between the first main body 1 and the second main body 2 is realized in the electronic apparatus according to the present disclosure.

In the accompanying drawings described above, the first main body 1 and the second main body 2 are illustrated as display side and system side, which are quite different in appearance from each other. However, the shape design of the first main body 1 and the second main body 2 and the overall design of the electronic apparatus can be in different solutions and have variations, as briefly described below.

Figure 31:
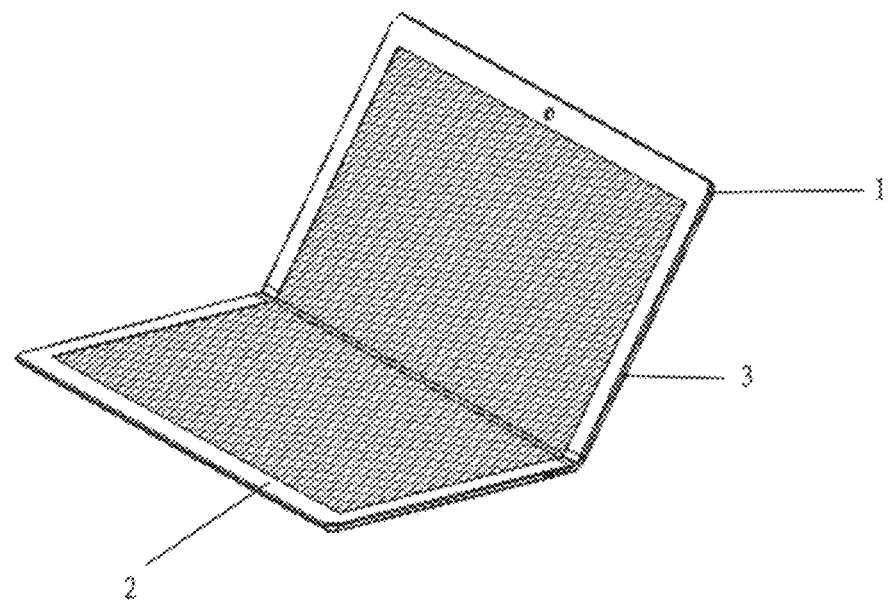
FIG. 31 is a 3D view of an electronic apparatus with an integral display screen according to the present disclosure, wherein the first main body and the second main body are at an angle in relation to each other.
Figure 32:
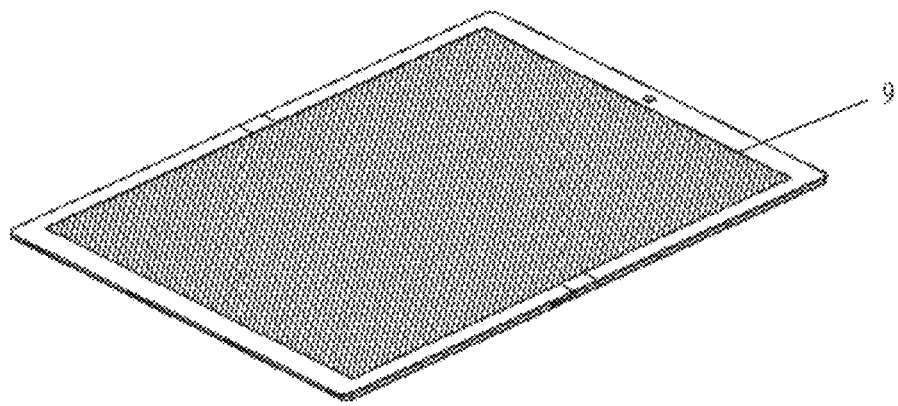
FIG. 32 is a 3D view of an electronic apparatus with an integral display screen according to the present disclosure, wherein the first main body and the second main body are in a 180° unfolded state.

As shown in FIG. 31 and FIG. 32, the electronic apparatus also includes a first main body 1, a second main body 2, and a rotating mechanism 3 disposed between the first main body 1 and the second main body 2. However, in appearance, the electronic apparatus employs an integral display screen, which can be rotated up to 360° by means of the rotating mechanism 3. Apparently, the electronic apparatus can be embodied as a tablet PC.

Figure 33:
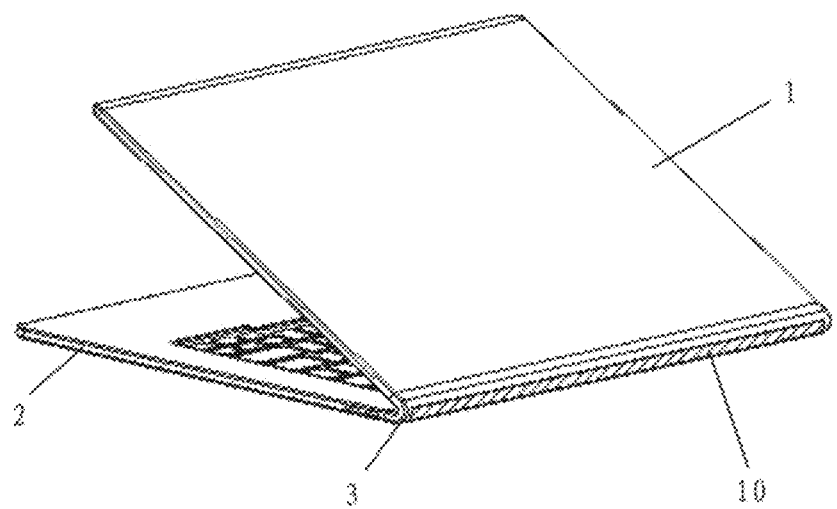
FIG. 33 and FIG. 34 are 3D views of an electronic apparatus with a small display screen fitted at a part of the electronic apparatus corresponding to the connecting device according to the present disclosure, wherein the first main body and the second main body are in different folded states in FIG. 33 and FIG. 34.

Please see FIG. 33, wherein at least the first main body 1 is provided with a display screen and forms a display part, and the second main body 2 is provided with a physical keyboard structure. Please note: on the back of the electronic apparatus, a small display screen is fitted at a part corresponding to the rotating mechanism 3, to display information that contains prompting or aiding content. In addition, as an alternative option, at the same side as the first main body 1 and the display screen, an additional small display screen can be fitted at a part corresponding to the rotating mechanism 3, to display information that contains prompting or aiding content.

Figure 34:
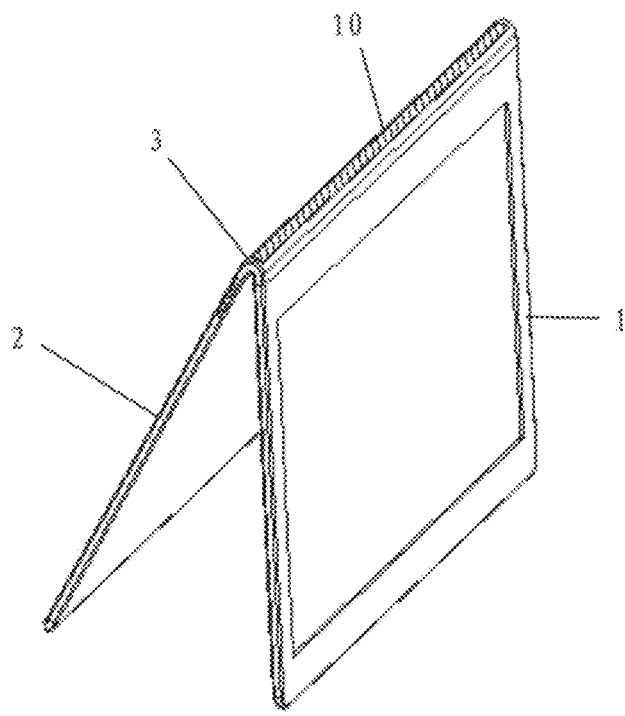

Please see FIG. 34, wherein the electronic apparatus is fitted with a small display screen at a part corresponding to the rotating mechanism 3, and both the first main body 1 and the second main body 2 of the electronic apparatus can be fitted with a display screen, such as a touch screen. Similarly, as an alternative option, on the back of the electronic apparatus, an additional small display screen can be fitted at a part corresponding to the rotating mechanism 3, between the two separate display screens on the first main body 1 and the second main body 2, to display information that contains prompting or aiding content.

Moreover, though the electronic apparatus shown in FIG. 31 and FIG. 32 is fitted with an integral display screen, a separate small display screen can be presented by means of electronic control at a part corresponding to the rotating mechanism, to display information that contains prompting or aiding content. In addition, as an alternative option, just like the embodiment shown in FIG. 33 and FIG. 34, on the back of the electronic apparatus, an additional small display screen can be fitted at a part corresponding to the rotating mechanism 3.

The connecting device put forth in the present disclosure can prevent occurrence of folds and crumples on compressed surfaces, and thereby improves man-machine interaction and enables the user to enjoy a better experience.

Moreover, since the electronic apparatus put forth in the present disclosure employs the connecting device disclosed in the present disclosure, it has improved product quality, improved man-machine interaction, and obtains new functions.

Some embodiments of the connecting device and electronic apparatus disclosed in the present disclosure are described above. The specific features of the connecting device and electronic apparatus disclosed in the present disclosure, such as shape, size, and position, can be configured specifically on the basis of the features disclosed above, and all these designs can be envisaged by those skilled in the art. In addition, the technical features disclosed above are not limited to the disclosed combinations with other features. Those skilled in the art can make various other combinations among the technical features for the purpose of the present disclosure, as long as the objects of the present disclosure can be attained.

The invention claimed is:

1. A connecting device configured to rotatably connect a first main body and a second main body of an electronic apparatus, the connecting device comprising:
a rotating mechanism rotatably connecting the first main body and the second main body;
a coating mechanism covering at least a part of the rotating mechanism; and
a supporting component supporting an inner side wall of the coating mechanism so that the coating mechanism is bent without folds or crumples as the rotating mechanism is rotated, wherein the supporting component comprises at least one connecting column and a first end of the at least one connecting column is connected with the inner side wall of the coating mechanism.

2. The connecting device of claim 1, wherein a first end of the supporting component is connected with the inner side wall and a second end of the supporting component is connected with the rotating mechanism.

3. The connecting device of claim 1, wherein the coating mechanism comprises a first coating element covering a first side of the rotating mechanism and the first end of the supporting component is connected with a first inner side wall of the first coating element.

4. The connecting device of claim 3, wherein the coating mechanism comprises a second coating element covering a second side of the rotating mechanism and the second end of the supporting component is connected with a second inner side wall of the second coating element such that the supporting component supports the first coating element and the second coating element therebetween.

5. The connecting device of claim 1, wherein the at least one connecting column has a circular, rectangular, or elliptical cross-section.

6. The connecting device of claim 1, wherein a spacing among the connecting columns is set according to the material properties of the first coating element and the second coating element.

7. The connecting device of claim 1, wherein the connecting columns are divided into several groups that are arranged at an interval along a transverse axis of the rotating mechanism.

8. The connecting device of claim 1, wherein the coating mechanism is a flexible coating part made of silica gel.

9. The connecting device of claim 1, wherein the strength of the inner side wall of the coating mechanism is lower than that of an outer side wall of the coating mechanism.

10. The connecting device of claim 9, wherein the strength of a first material used to produce the inner side wall is lower than that of a second material used to produce the outer side wall.

11. The connecting device of claim 9, wherein the inner side wall is arranged with at least one groove that expands towards the inner side wall to induce the coating mechanism to bend towards the outer side wall when the first main body and the second main body are driven by the rotation of the rotating mechanism to bend towards the outer side wall.

12. The connecting device of claim 11, wherein the coating mechanism comprises a first coating element for covering the first side of the rotating mechanism that comprises a first inner side wall with a plurality of first grooves and a first outer side wall.

13. The connecting device of claim 12, wherein the coating mechanism comprises a second coating element for covering a second side of the rotating mechanism that comprises a second side wall with a plurality of second grooves.

14. The connecting device of claim 11, wherein the groove extends in a direction generally parallel to a transverse axis of the rotating mechanism.

15. The connecting device of claim 13, wherein a number of each of the first groove and the second groove are more than one, and a spacing between the first grooves and the spacing between the second grooves are set according to material properties of the first coating element and the second coating element.

16. The connecting device of claim 13, wherein a number of each of the first groove and the second groove are more than one, and both the first grooves and the second grooves are divided into several groups that are arranged at an interval along a transverse axis of the rotating mechanism.

17. The connecting device of claim 11, wherein the supporting component and the groove are arranged alternatively along the transverse axis of the rotating mechanism.

18. The connecting device of claim 11, wherein the supporting component and the groove are arranged alternatively in a direction orthogonal to a transverse axis of the rotating mechanism.

19. The connecting device of claim 11, wherein the supporting component is connected with a ridge of the groove.

20. An electronic apparatus comprising the connecting device according to claim 1, wherein at least one of the first main body and the second main body is fitted with a display screen, or the first main body and the second main body are fitted with an integral display screen that can be bent freely at a part corresponding to the connecting device.

21. The electronic apparatus of claim 20, wherein if the at least one of the first main body and the second main body is fitted with a display screen, the electronic apparatus is provided with an additional small display screen configured to display information that contains prompting or aiding content at least at one side of a part of the electronic apparatus corresponding to the connecting device; or if the first main body and the second main body are fitted with an integral display screen, the part of the integral display screen corresponding to the connecting device can display as a small display screen for displaying information that contains prompting or aiding content and/or the electronic apparatus is fitted with an additional small display screen configured to display information that contains prompting or aiding content at the other side of the connecting device.

* * * * *